United States Patent [19]

Seabrook et al.

[11] Patent Number: 4,789,188
[45] Date of Patent: Dec. 6, 1988

[54] SWIVEL OR ROTATING JOINTS

[75] Inventors: Colin Seabrook, Skerne; Simon D. Usher, Braintree, both of England

[73] Assignee: J. H. Fenner & Co. Limited, North Humberside, England

[21] Appl. No.: 880,076

[22] Filed: Jun. 30, 1986

[30] Foreign Application Priority Data

Jun. 29, 1985 [GB] United Kingdom ............... 8516504

[51] Int. Cl.⁴ .............................................. F16L 7/00
[52] U.S. Cl. ...................................... 285/94; 285/276; 285/93; 285/121; 184/31
[58] Field of Search ................... 285/276, 94, 119, 93, 285/121; 184/31; 384/462, 473, 474, 606, 471

[56] References Cited

U.S. PATENT DOCUMENTS

| 2,010,886 | 8/1935 | Paradise | 285/94 |
| 2,434,459 | 1/1948 | Dahlstrand | 184/31 X |
| 2,449,059 | 7/1941 | Stenger | 184/31 X |
| 2,727,760 | 12/1955 | Fawick | 285/94 X |
| 4,234,216 | 11/1980 | Swanson | 285/94 X |

Primary Examiner—Dave W. Arola
Attorney, Agent, or Firm—Gipple & Hale

[57] ABSTRACT

A swivel joint for interconnecting two lengths of pipe, comprising an inner member (1) and an outer member (2), a chamber defined by the inner member (1) and the outer member (2) and accommodating bearing means (15a, 15b) locating the inner member (1) and the outer member (2) for rotary movement relative to one another. Pump means (8) for circulating lubricant within the chamber is provided, which pump means (8) is driven by relative movement between the inner member (1) and the outer member (2).

12 Claims, 2 Drawing Sheets

SWIVEL OR ROTATING JOINTS

The present invention relates to swivel or rotating joints of the type employed in a pipeline to allow relative movement between two sections of pipe.

A swivel joint is typically used as a means of connecting together the ends of two pipes in a way which maintains them in substantial axial alignment while allowing relative rotary movement therebetween. Typically such movement may be oscillatory and of a magnitude of 1 to 2 degrees, but could be a complete revolution. A known swivel joint comprises an inner member and an outer member which are adapted to be secured to the ends of respective pipes. A bearing or bearings are disposed between the inner and outer members to support same with respect to one another. The bearing or bearings may be tapered roller thrust bearings. The bearing is received within a chamber which is filled with grease to lubricate the joint.

Because in many instances, the movement of the joint is only limited, such bearings can run dry of lubrication in discrete areas because the limited movement of the bearing means there is nothing to circulate the grease within the chamber. This problem is exaggerated where the pipe run is continuously horizontal or vertical since grease may then settle to the lower half of the bearing chamber.

It is an aim of the present invention to provide a swivel joint which overcomes the above mentioned lubrication problem and improves the lubrication of a joint mounted in any attitude.

According to the present invention there is provided a swivel joint for interconnecting two lengths of pipe, comprising an inner annular member and in use, to be connected to a first length of pipe, an outer annular member co-axial with the inner annular member and adapted, in use, to be connected to a second length of pipe, an annular chamber defined between the inner and outer annular members, bearing means positioned within the annular chamber and locating the inner and outer annular members for rotary movement relative to one another, and pump means located within the annular chamber for circulating lubricant within the annular chamber, which pump means is driven by relative rotary movement between the inner annular member and the outer annular member.

In one embodiment the pump means comprises an eccentric ring which is disposed within the annular chamber defined between the inner and outer members and which is rotatably driven within the annular chamber.

Preferably, the eccentric ring is separated from the bearing means by an annular side plate, the annular side plate dividing the annular chamber into an annular pump chamber and an annular bearing chamber. The side plate is provided with a plurality of holes therein, preferably circumferentially spaced therearound, by means of which, lubricant passes between the annular pump chamber of the eccentric ring acting as a pump cam and the annular bearing chambers accommodating the bearing means. Preferably, two axially spaced bearing assemblies are provided, and the eccentric ring is disposed therebetween. Rotation of the eccentric ring ensures that lubricant is displaced from the annular pump chamber as the eccentric ring passes the holes one after the other in succession during its indexing movement. It will be appreciated that the holes are successively covered and uncovered during rotation of the eccentric ring. The bearings are preferably spherical tapered thrust bearing.

Conveniently, the pump means comprises a ratchet drive mechanism. Preferably, the inner and outer circumference of the eccentric ring are provided with ratchet teeth thereon and a respective ratchet pin is located with respect to the inner member and the outer member for co-operating engagement with the eccentric ring to index same on relative rotation It is feasable to provide ratchet teeth on only the inner or outer circumference of the eccentric ring but this is less preferable to having ratchet teeth on both which ensures a more positive drive. Nevertheless, if frictional force can be applied to the eccentric ring to resist movement with respect to one of the inner or outer members, then only one surface need be provided with ratchet teeth.

As an alternative, it is envisaged that the ratchet drive mechanism is applied to axial faces of the eccentric ring rather than to the circumferential faces.

As yet another alternative, diametrically opposed spring loaded plungers are provided to contact the outer periphery of the eccentric ring to apply the desired frictional force.

It will be appreciated that several other types and arrangements of drive means may be employed to rotate the eccentric ring in response to relative movement between the inner and outer members of the joint.

Accordingly, the invention provides a method of lubricating the bearings of a swivel joint for interconnecting two lengths of pipe, in which relative rotary movement between an inner annular member connected to one of said pipes and an outer annular member connected to the other of said pipes is employed to drive a pump means located within an annular chamber defined between the inner annular member and the outer annular member and thereby to circulate lubricant around the annular chamber and into the bearings to force lubricant into the bearings.

Conveniently, the method utilizes relative rotary motion of the two parts to rotate an eccentric ring within the annular chamber whereby lubricant is circulated around the annular chamber and into the bearings. Conveniently, the lubricant is forced out of a plurality of circumferentially spaced holes in succession as the ring rotates. A ratchet drive mechanism is employed to rotate the eccentric ring.

The swivel joint according to the invention has many applications of which the following are quoted as examples:

(i) in the transmission pipes for fluids and gases in the petroleum industry.

(ii) as a single bouy moving connection.

(iii) in loading arms for vessels.

(iv) as general pipeline swivel connections to accommodate relative movement between sections of pipe.

(v) in water injection pipelines.

The present invention will now be described further, by way of example only, with reference to the accompanying drawings; in which.

Figure 1:
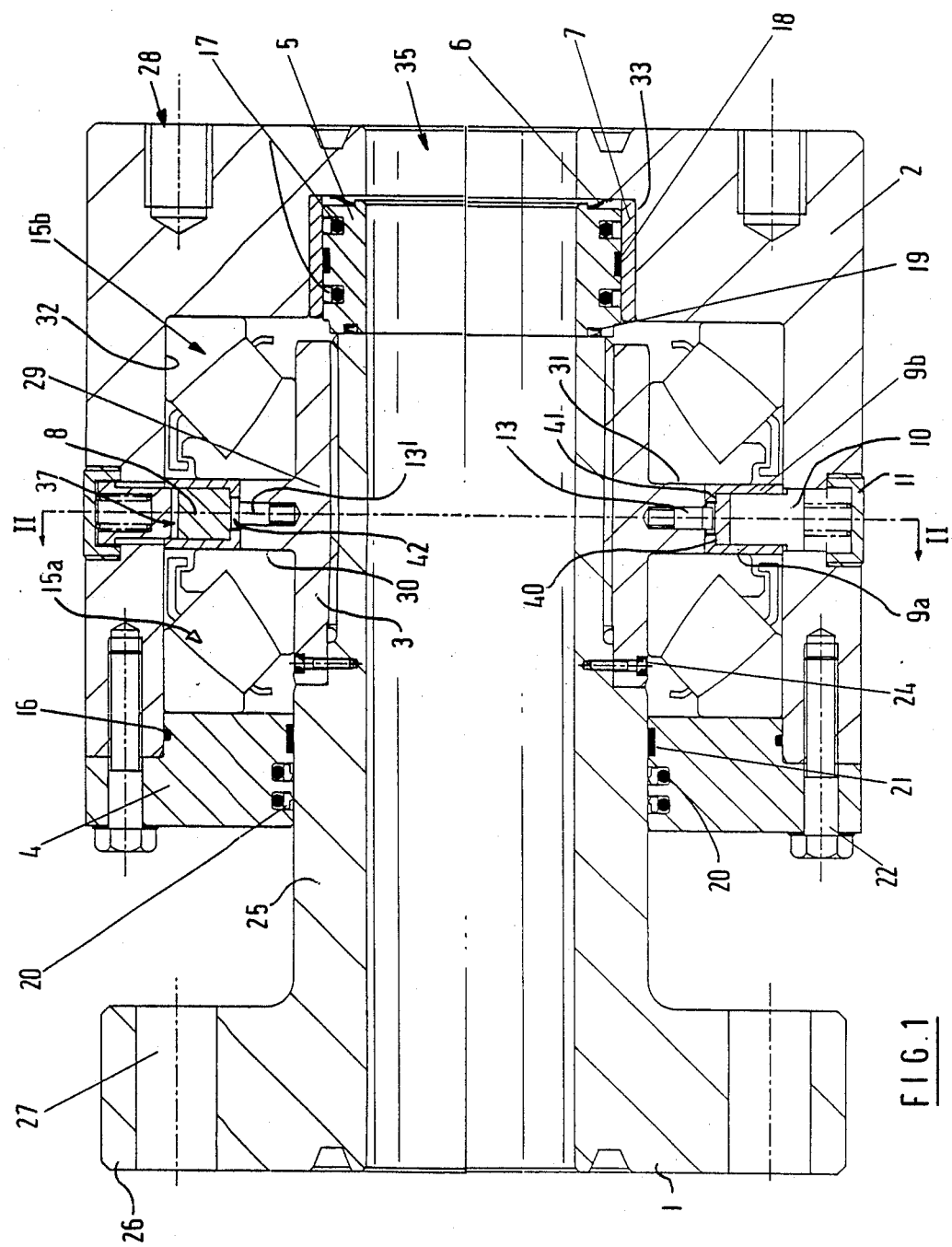
FIG. 1 is a sectional side view of a swivel joint in accordance with the present invention.

The drawings illustrate one embodiment of swivel or rotating joint, which comprises an inner member or sleeve 1, and an outer member or housing 2 which are located relative to one another by bearing means comprising two spherical tapered roller thrust bearings 15a, 15b. The inner sleeve 1 comprises a tubular portion 25 and a circumferential flange 26. The flange 26 has a plurality of equi-spaced holes 27 therein for use in securing the inner sleeve to the end of a first pipe. The outer housing 2 has a plurality of equi-spaced threaded blind bores 28 for use in securing the outer housing to the end of a second pipe which is to be joined to the first by means of the swivel joint.

The tubular portion 25 of the inner sleeve carries at its end a bearing support ring 3. This is threaded onto the tubular portion 25 in the illustrated embodiment and located in position by two or more socket head cap screws 24 which pass respectively through counter bored holes in the bearing support ring and engage threadingly with a respective hole in the tubular portion. The bearing support ring 3 is T-shaped in cross-section and defines a radial flange 29 having surfaces 30,31 which are engaged by the respective inner faces of the bearings 15a and 15b which are received on opposite ends of the bearing support ring.

The outer housing 2 has a bore 32 which receives the outer races of the bearings 15a and 15b. The outer race of the bearing 15b engages axially with the bottom of the bore 32, whilst the outer race of the bearing 15a is co-operable axially with a shear plate 4 which is secured to the outer housing by bolts 22. This shear plate serves to allow pre-loading of the bearing via the bolts and a shim may be inserted between the axial end face of the bearing outer load plate and the shear plate 4 to give the required bearing pre-load.

The shear plate 4 also serves to close off the chamber defined by the inner and outer members and accommodating the bearing means. The shear plate accommodates annular seals 16, 20 to retain the grease within the chamber. The seals 20 are preferably lip seals fitted opposite ways round, but may be replaced by a single seal. The grease is preferably introduced into the chamber under a small pressure. The shear plate also accommodates an annular bearing strip 21 which aids alignment of the shear plate 4.

Also interposed between the inner and outer members, as an axial extension of the tubular portion of the inner sleeve is a seal ring 5. This is received within a wear ring 7 which is a close interface fit in a bore 33 in the housing 2. Two seals 17 are provided between the seal ring 5 and the wear ring, and a seal 19 is interposed between the abuting ends of the tubular portion 25 and the seal ring 5. The seal ring 5 is spring biased into contact with the tubular portion by means of a plate spring washer 6. In use, pressure within the pipes and hence the internal bore 35 loads the seal ring 5 into contact with the inner sleeve. Thus, in practice the seal ring 5 moves as if fixed to the inner sleeve 1. An annular bearing strip 18 is positioned between the two seals 17 to support the seal ring. The seals 17 are preferably lip seals positioned the same way round to give back-up protection.

Although, as shown in the accompanying drawings, the seal ring 5 is a separate component from the bearing support ring 3, it can, if desired, be formed as an integral extension thereto. This arrangement obviates the need to bias the seal ring 5 into sealing engagement with the inner member (1) by means of plate spring washer 6 is the case in the arrangement of the drawing.

Disposed radially outwardly of the flange 29 of the bearing support ring 3 is an eccentric ring 8, that is to say a ring having inner and outer circumferential surfaces 36, 37 which are circular but whose centres are off set from one another. Thus, the cross-section of the ring varies around its periphery as will be seen from the drawings. The eccentric ring 8 is received within an annular chamber 38 which is defined circumferentially by the inner and outer members or parts secured thereto, and axially by the bearings 15a, 15b. More specifically, the axial limits of this chamber are defined by respective side plates 9a and 9b. The side plates 9a and 9b are annular and each have a plurality of holes 39 therein which in the illustrated embodiment are equi-spaced circumferentially and adjacent the outer periphery of the side plates. These holes allow communication between the chamber 38 which serves as a pump chamber and the chamber accommodating the respective bearings 15a and 15b. The side plates 9a and 9b are located on the outer periphery of the radial flange 29 and are so shaped to embrace the eccentric ring at its inner circumference 36. Thus, the eccentric ring is guided for rotation on these side plates on the respective surfaces 40,41. The side plates are spaced apart axially by the eccentric ring, and an inner ratchet surface 42 defines the inner circumference 36 of the eccentric ring. The ratchet surface as illustrated is of saw tooth configuration and is engaged by a ratchet pin 13 which is slidably received in a bore 43 in the radial flange 29 of the bearing support ring 3. A spring 14 is disposed in the bore 43 and urges the ratchet pin into co-operation with the inner ratchet surface of the eccentric ring. The end of the ratchet pin is formed with a tooth which is complementary in shape to the inner ratchet surface. The ratchet pin is preferably disposed on the diameter of the bearing support ring.

In the illustrated embodiment a further ratchet pin 13' is disposed substantially diametrically opposite the ratchet pin 13. This further ratchet pin is urged into co-operating engagement with the inner ratchet surface 42 of the eccentric ring 8. The ratchet pin 13' is received in a bore 43' in the bearing support ring 3 and urged by a spring 14'. As will be seen from FIG. 2 of the drawings, the positioning of the ratchet pins 13 and 13' are such that when the tooth of on ratchet pin is fully engaged with a recess in ratchet surface of the eccentric ring, the tooth of the other ratchet pin is only partially engaged with another recess in the ratchet surface. This off set arrangement gives rise to a finer ratchet adjustment facility. In the illustrated embodiment, the off set arrangement is achieved by arranging for the ratchet pins to be 179° apart rather than diametrically opposite of another. However, it will be appreciated that the dimension of the ratchet teeth 42 on the eccentric ring could be varied to achieve the same result with the ratchet pins disposed diametrically opposite. It will be appreciated that it is not essential for the ratchet pins to be diametrically opposite—but this is to be preferred. It will also be appreciated that only one ratchet pin 13 may be employed or alternatively a plurality of ratchet pins.

Radially outwardly of the inner ratchet pin 13 is an outer ratchet pin 10 which is urged into co-operating engagement with the outer circumference 37 of the eccentric ring at which is formed an outer ratchet surface. The outer ratchet surface has a saw tooth-like configuration, and the outer ratchet pin 10 is formed with a complimentarily shaped tooth form. The outer ratchet pin 10 is received in a bore 45 in the housing 2 and a spring 12 biases the outer ratchet pin 10 radially inwardly. In the illustrated embodiment, a cap 11 which engages threadingly with the housing 2 is employed to close off the bore 45. The provision of this cap allows the ratchet teeth of the outer ratchet member to be inspected and replaced if necessary without dismantling the entire joint. With the outer ratchet pin 10 removed, the bore can also be used to introduce lubricant into the housing.

Disposed diametrically opposite to the outer ratchet pin 10 (or slightly offset to obtain finer ratchet movement) is a second outer ratchet pin 10' which is received in a bore 45' in the housing 2 and biased into engagement with the outer ratchet surface of the eccentric ring by a spring 12'. The bore 45' is closed off by a cap 11' in a similar way to that described with reference to outer ratchet pin 10. The outer ratchet pin 10' is likewise provided with a complimentary shaped tooth form on the end which engages the ratchet surface.

It will be noted that, in the illustration, the ratchet teeth 42 have a different configuration to the ratchet teeth at the outer periphery 37. This is to be preferred but is by no means essential. It will also be noted from FIG. 1 that the ratchet teeth at the outer periphery 37 extend the full width of the eccentric ring 8, whilst the ratchet teeth 42 at the inner periphery are narrower than the eccentric ring. This again is a preferred arrangement.

It will be appreciated that on assembly the chamber accommodating the bearings 15a, 15b and the annular chamber 38 accommodating the eccentric ring are packed with lubricant—typically in the form of a grease. The grease is preferably introduced into the pump chamber and hence into the chamber accommodating the bearings by way of a bore 50. A grease nipple is fitted into the bore for this purpose and then removed and the bore blanked off by a plug 51. In order to ensure that this grease remains in contact with the moving parts for prolonged periods of use, or more especially to ensure that all the individual rollers or balls in the bearing are at least periodically lubricated, the eccentric ring serves as a pump cam which distributes lubricant successively to different areas of the bearing.

Figure 2:
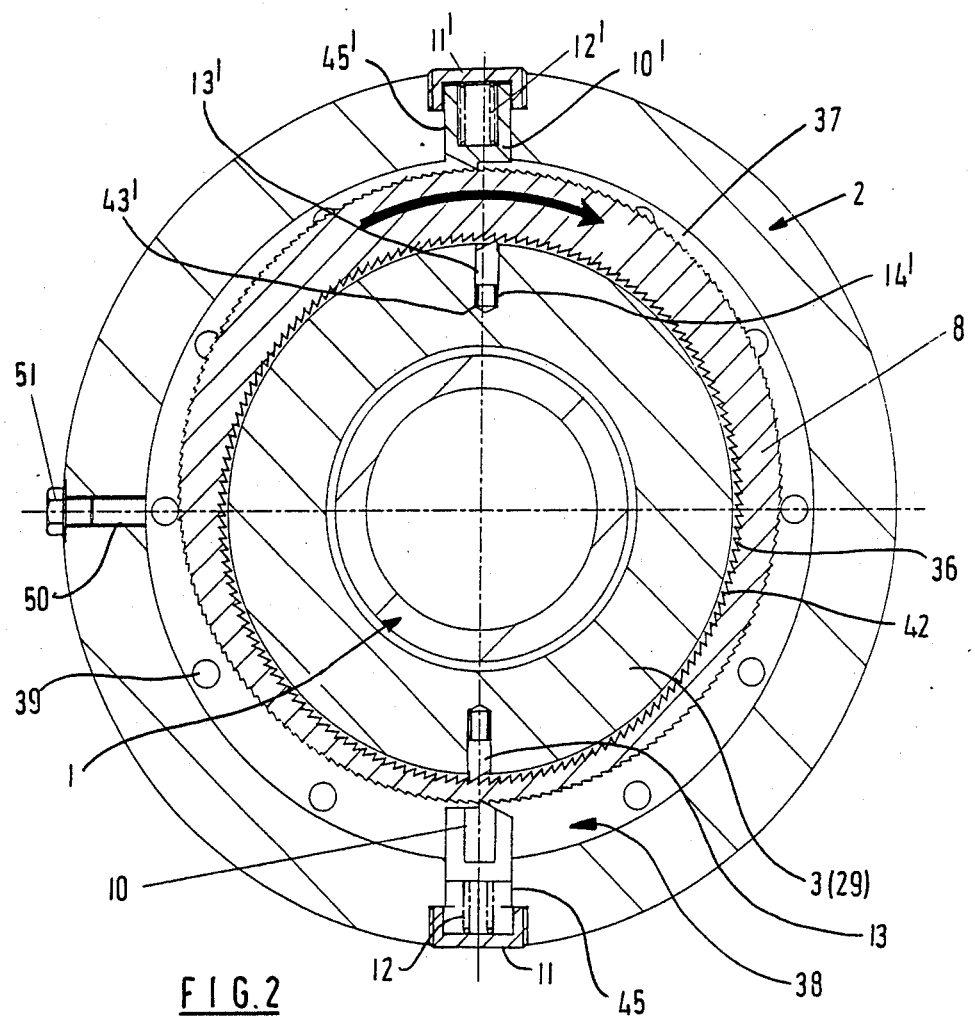
FIG. 2 is a cross-sectional view on line II—II of FIG. 1.
Figure 3:
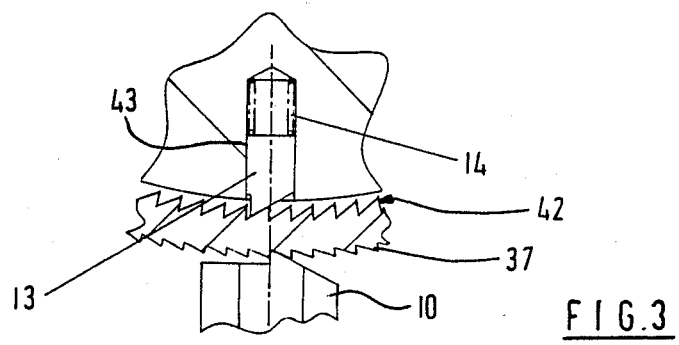
FIG. 3 is an enlarged detail view of the ratchet mechanism of FIG. 2.

Upon relative rotation of the inner sleeve and outer housing—which rotation may at worst be an oscillation of only 1 to 2 degrees—the ratchet mechanism causes the eccentric ring to rotate in the direction of the arrow A in FIG. 2. Since one point X on the eccentric ring is disposed immediately adjacent the bore 32 and moves in a clockwise direction as viewed in the drawing, grease in the chamber immediately in front of this point is forced out of the successive holes 39 which are covered by the eccentric ring 8 as it rotates. Movement of grease circumferentially within the annular pump chamber is prevented by the spring loaded outer ratchet pins 10, 10' which act as followers. These followers also have the effect of creating a partial reduction in pressure on the trailing side of the cam ring—so that grease is drawn back into the annular chamber 38 on the trailing side. Thus, lubricant is successively pushed out from the annular chamber 38 to ensure that all parts of the bearing are lubricated irrespective of the orientation of the joint and the amount of relative rotation between the inner and outer members.

I claim:

1. A swivel joint for interconnecting two lengths of pipe, comprising an inner annular member adapted, in use, to be connected to a first length of pipe, an outer annular member co-axial with the inner annular member and adapted, in use, to be connected to a second length of pipe, an annular chamber defined between the inner and outer annular members, bearing means positioned within the annular chamber and locating the inner and outer annular members for rotary movement relative to one another, and pump means located within the annular chamber for circulating lubricant within the annular chamber, said pump means comprising an eccentric ring which is disposed within the annular chamber defined between the inner annular member and the outer annular member and which is rotatably driven within the annular chamber by relative rotary movement between the inner annular member and the outer annular member.

2. A swivel joint according to claim 1 wherein the bearing means comprises two axially spaced bearing assemblies and the eccentric ring is disposed there between.

3. A swivel joint according to claim 2 wherein each of the bearing assemblies comprises a spherical tapered thrust bearing.

4. A swivel joint according to claim 1, wherein said eccentric ring is separated from said bearing means by an annular side plate, the annular side plate dividing the annular chamber into an annular pump chamber and an annular bearing chamber.

5. A swivel joint according to claim 4, wherein a plurality of holes are provided in the side plate, through which lubricant passes between the annular pump and the annular bearing chamber.

6. A swivel joint according to claim 1, wherein the eccentric ring is rotatably driven within the annular chamber by friction drive means.

7. A swivel joint according to claim 1 including friction drive means which comprises diametrically opposed spring loaded plungers located with respect to the outer annular member, said spring loaded plungers frictionally engaging the outer periphery of the eccentric ring to index the eccentric ring about its axis of rotation upon relative rotary movement of the inner annular member and the outer annular member.

8. A swivel joint according to claim 1, wherein the eccentric ring is rotatably driven within the annular chamber by a ratchet drive mechanism.

9. A swivel joint according to claim 8, wherein the eccentric ring is provided with ratchet teeth thereon and at least one ratchet pin is located with respect to the inner annular member and the outer annular member for co-operating engagement therewith to index the eccentric ring about its axis of rotation upon relative rotary movement of the inner annular member and the outer annular member.

10. A swivel joint according to claim 9, wherein the said at least one ratchet pin is spring biased into contact with the eccentric ring.

11. A method of lubricating the bearings of a swivel joint for interconnecting two lengths of pipe, in which relative rotary movement between an inner annular member connected to one of said pipes and an outer annular member connected to the other of said pipes is employed to drive a pump means comprising eccentric ring means located within an annular chamber defined between the inner annular member and the outer annular member and thereby circulate lubricant around the annular chamber and into the bearings said relative rotary motion of the inner annular member and the outer annular member being utilized to rotate said eccentric ring means within the annular chamber so that lubricant is circulated around the annular chamber and into the bearings.

12. A swivel joint for interconnecting two lengths of pipe, comprising an inner annular member adapted, in use, to be connected to a first length of pipe, an outer annular member co-axial with the inner annular member and adapted, in use, to be connected to a second length of pipe, an annular chamber defined between the inner and outer annular members, bearing means positioned within the annular chamber and locating the inner and outer annular members for rotary movement relative to one another, and pump means located within the annular chamber for circulating lubricant within the annular chamber, said pump means being driven by relative oscillatory movement between the inner annular member and the outer annular member.

* * * * *